United States Patent
Jain (10) Patent No.: US 12,131,072 B2
(45) Date of Patent: Oct. 29, 2024

(54) INDEPENDENT SET DATA LANES FOR IOD SSD

(71) Applicant: Kioxia Corporation, Tokyo (JP)

(72) Inventor: Amit Rajesh Jain, Cupertino, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/353,515

(22) Filed: Jul. 17, 2023

(65) Prior Publication Data

US 2023/0359401 A1 Nov. 9, 2023

Related U.S. Application Data (63) Continuation of application No. 16/523,925, filed on Jul. 26, 2019, now Pat. No. 11,704,056.

(51) Int. Cl.
*G06F 3/06* (2006.01)
*G06F 9/54* (2006.01)
*G06F 13/16* (2006.01)

(52) U.S. Cl.
CPC .......... *G06F 3/0659* (2013.01); *G06F 3/0604* (2013.01); *G06F 3/0679* (2013.01); *G06F 9/54* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 5,805,873 A | 9/1998 | Roy | |
| 10,613,765 B2 | 4/2020 | Kim | |
| 2010/0057979 A1* | 3/2010 | Chu | G06F 12/0246 711/E12.001 |
| 2010/0122022 A1 | 5/2010 | Luo et al. | |
| 2016/0202910 A1 | 7/2016 | Ravimohan et al. | |
| 2017/0123696 A1 | 5/2017 | Kelner et al. | |
| 2019/0004724 A1 | 1/2019 | Kanno | |
| 2019/0042150 A1 | 2/2019 | Wells et al. | |

OTHER PUBLICATIONS

Carlson, Mark, "Achieving Predictable Latency for Solid State Drives," Storage Developer Conference EMEA, pp. 1-32, 2018.
Final Office Action in U.S. Appl. No. 16/523,925 dated May 4, 2022.
Foreign Search Report in PCT PCT/IB2020/056930 dated Sep. 15, 2020.
Non-Final Office Action in U.S. Appl. No. 16/523,925 dated Sep. 17, 2020.
Non-Final Office Action in U.S. Appl. No. 16/523,925 dated Sep. 28, 2022.
Non-Final Office Action in U.S. Appl. No. 16/523,925 dated Nov. 24, 2021.
Non-Final Office Action in U.S. Appl. No. 16/523,925 dated Mar. 4, 2021.
Notice of Allowance in U.S. Appl. No. 16/523,925 dated Mar. 6, 2023.
U.S. Office Action in U.S. Appl. No. 16/523,925 dated Aug. 3, 2021.

* cited by examiner

*Primary Examiner* — Brian R Peugh
(74) *Attorney, Agent, or Firm* — Foley & Lardner LLP (57) ABSTRACT

Various implementations described herein relate to systems and methods for enabling a data lane for communicating messages for each of a plurality of regions of a non-volatile memory. Each of the plurality of regions includes a plurality of dies. The messages for each of the plurality of regions are communicated via the data lane.

20 Claims, 6 Drawing Sheets

FIG. 5

INDEPENDENT SET DATA LANES FOR IOD SSD

CROSS-REFERENCE TO RELATED PATENT APPLICATIONS

This application is a continuation of U.S. patent application Ser. No. 16/523,925, filed on Jul. 26, 2019, now U.S. Pat. No. 11,704,056 the contents of which are incorporated herein by reference in their entirety.

TECHNICAL FIELD

The present disclosure generally relates generally to systems and methods for providing input/output (I/O) deterministic (IOD) solid state drives (SSDs).

BACKGROUND

A SSD includes a number of non-volatile memory devices such as but not limited to, NAND flash memory devices controlled by a controller such that the NAND flash memory devices behavior like a single drive. The NAND flash memory devices are subject to host originated I/O operations such as reading and writing data stored in the NAND flash memory devices, which may originate from multiple disparate applications running on one or more hosts. A NAND flash memory device may only be processing a single I/O operation at any one time and a memory bus/channel connecting multiple NAND flash devices to a memory controller may only be transferring data for a single memory device at any one time. Traditionally, a host application attempting to read data from, or write data to, an SSD therefore typically experiences varying levels of latencies due to having to share access to the memory devices with other applications. Furthermore, because the I/O activities of different applications are typically not synchronized or related, the latencies as experienced by a single application are unpredictable. In an example in which a host resides within a datacenter having a large number of SSDs and hosts running multiple disparate applications to store and retrieve data, the host has no control over the unpredictable latencies of the SSDs when requesting the SSDs to perform I/O operations for an application due to the simultaneous and unconnected activities of other hosts and applications. The host experience can further deteriorate in the scenario where the host is running time-sensitive applications (e.g., real-time data gathering, real-time data distribution, and so on) on the SSDs.

In an attempt to limit the effect of one application having a deleterious effect of the I/O latencies experienced by another, the NVM Express™ v1.4 base protocol specification for non-volatile memory storage introduced the concept of an "non-volatile memory (NVM) set" where the non-volatile storage was divided into separately addressable regions. These regions were logically and/or physically separate areas of memory, which enabled separate host applications to exclusively access separate areas of memory without having to share memory resources with each other. However, there remains the need for a NAND flash memory controller in an SSD to have the capability to handle the I/O from multiple disparate host applications to multiple NVM sets with deterministic and predictable I/O latencies (also referred to as I/O Determinism, IOD) for the host applications and improving the experience of the host applications with respect to I/O operations on the SSD.

SUMMARY

In certain aspects, the present implementations of a SSD device are directed to systems and methods for providing independent data lanes to support IOD features of the SSD device.

DETAILED DESCRIPTION

Among other aspects, IOD drives refer to SSDs that implement IOD features as described herein. A physical space of an IOD drive is physically partitioned into various regions or isolation regions ("islands") of storage spaces referred to as NVM sets. The physical partitioning can be performed by physical blocks and/or dies of the NAND flash memory devices of the IOD drive. Each NVM set is logically managed to be independent of the logics of other NVM sets of the IOD drive. That is, each physical petition of the IOD drive is mapped to a logical petition of the IOD drive. The IOD drive can independently manage the logics performed on each NVM set and allocate the appropriate storage space and bandwidth to each NVM set. I/O operations with respect to a NVM set are guaranteed a certain level of bandwidth from the NVM set, independent of the other NVM sets, thus allowing latencies to be predictable to the host as the host is aware of the guaranteed bandwidth. The host can therefore execute storage and compute functions using the IOD drives with the expectation of the guaranteed bandwidth, which can always be fulfilled due to the characteristics of IOD drives. Example architectures of the IOD drives can be found in U.S. Patent Pub. No. US 2019/0042150, titled "SSD ARCHITECTURE SUPPORTING LOW LATENCY OPERATION," filed on Nov. 1, 2017, which is hereby incorporated by reference in its entirety.

In a so-called "noisy neighbor" scenario of a regular, non-IOD, SSD, the I/O operations of a first application may affect the operations and the latencies experienced by a second application. With an IOD drive, even though the first application executed by the host pertains to the I/O operations on the first NVM set and not the second NVM set, the "noisy neighbor" phenomenon may yet be caused by improper physically petitioning of the IOD drive. In addition, although the IOD drive is petitioned physically and logically into multiple NVM sets, the controller that performs and controls the logical functions may cause delays for the I/O operations of one NVM set of the IOD drive due to the I/O operations of another NVM set of the IOD drive, due to the sharing of compute and/or hardware resources between the NVM sets by the controller. As such, a controller that logically manage multiple NVM sets of the IOD drive may become a bottleneck for I/O operations of the multiple NVM sets, thus still contributing to the "noisy neighbor" phenomenon in spite of the physical partitioning of the non-volatile storage allocated to NVM sets in an IOD drive.

A process flow within a controller used to perform I/O operations of an IOD drive is referred to as an I/O path. In some cases, the I/O path includes multiple control flows and communications between multiple processes, often on multiple processors, and/or controllers. The I/O path includes a host on one end of the I/O path, the NAND flash memory devices on the other end of the I/O path, and multiple processes and/or processors between the host and the NAND flash memory devices. The communication between the processes and/or processors can be aided by inter-process communications (IPCs), each of which corresponds to a communication link between two processes/processors that are in communication with one another. Multiple message types can be transferred on IPCs between the processes. For an IOD drive, before data is written to or read from the NAND flash memory devices of the IOD drive, the IPCs carry messages of each NVM set in the I/O path. While a number of processors and processes may remain the same on the controller, IPC infrastructure and scheduling of traditional firmware result in collisions and resource bottlenecks between multiple NVM sets of the IOD drive.

Traditional IPC schemes used in non-IOD drives are unfit for implementation on the IOD drives as those IPC schemes lack the capabilities to avoid resource contention and inverted priorities between IPC messages of a same type, where the IPC messages belong to multiple NVM sets. In an example in which a processor is currently handling IPC S0-A of SET-0, and the processor receives IPC S1-A from SET-1 while the processor is handling IPC S0-A and receives IPC S2-A from SET-2 after S1-A is received, S0-A, S1-A, and S2-A will be handled on the processor in that order according to traditional IPC schemes. S0-A, S1-A, and S2-A are of a same message type and are handled by the same processor. If the NAND flash memory devices are busy on SET-0 or controller resources for SET-0 are unavailable, processing S0-A would take longer. The long processing time of S0-A can further delay processing of S1-A and S2-A because S0-A, S1-A, and S2-A are processed sequentially in that order. Accordingly, the traditional IPC schemes increases latencies on IPC messages of SET-1 and SET-2 due to traffic conditions on SET-0, thus contributing to the "noisy neighbor" phenomenon. This problem is compounded by the significant number of processes and control paths within the controller for the I/O operations.

Embodiments disclosed herein relate to systems, apparatuses, methods, and non-transitory computer readable media for providing a low-latency IPC scheme implemented on a controller of a drive capable of IOD features. The IPC scheme is implemented to connect processes, processors, hardware, the controller, the host, and the NAND flash memory devices of the drive. Firmware is configured to establish and manage an independent data lane for each NVM set of the IOD drive. Each independent data lane includes one or more IPCs and associated handlers.

In some implementations, an IOD drive can provide predictable latency for SSD, for example, by avoiding I/O conflicts and overheads among different NVM sets of the IOD drive. In some embodiments, IOD drives can ensure that the traffic profile and the load on one NVM set do not affect latencies on other NVM sets that are within a same drive (e.g., a same SSD). That is, the IOD drive is configured to prevent the "noisy neighbor" phenomenon by isolating each configured NVM set in the controller. That is, in addition to the physical NAND partitions that create isolated regions (for isolating NAND operations for each NVM set), the SSD firmware can be configured to ensure that the I/O handling within a controller is isolated for each IOD NVM set by being capable of providing an independent data lane for each NVM set of the SSD.

Figure 1A:
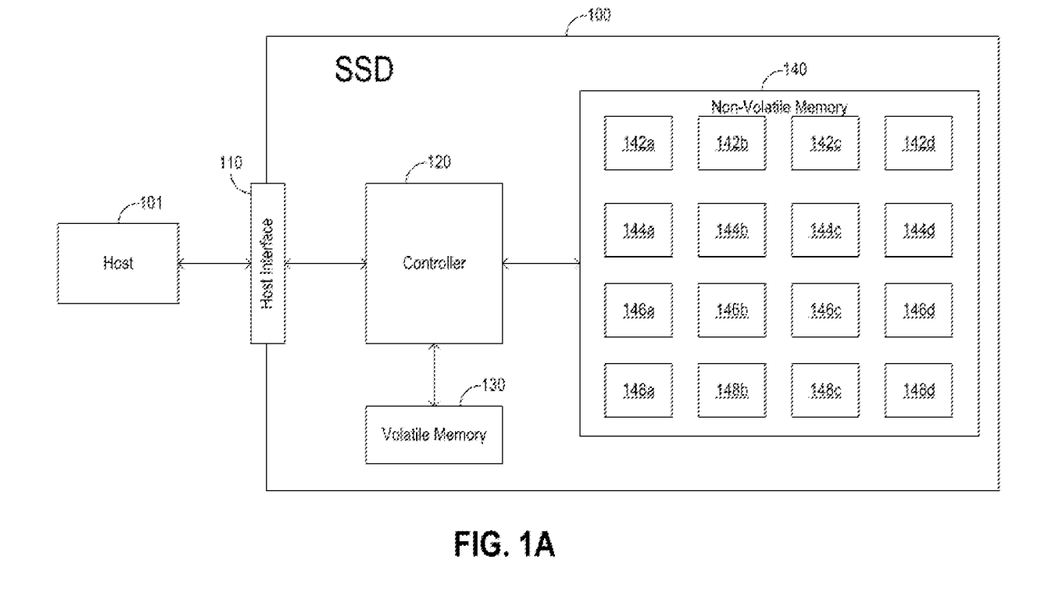
FIG. 1A shows a block diagram of an example SSD, according to some implementations.

FIG. 1A is a block diagram of a structure of an SSD 100, according to some implementations. As shown in FIG. 1A, a controller 120 is in communication with a host 101 through a host interface 110. The host 101 can be one or more one or more host devices or host applications. The host 101 can include any suitable device such as but not limited to, a computing device, storage appliance, and so on. In some examples, the host 101 can be a user device operated by a user. In some implementations, the host 101 and the SSD 100 reside in a datacenter (not shown). The datacenter includes a plurality of platforms, each of which can support a plurality of hosts (such as but not limited to, the host 101) and SSD devices (such as but not limited to, the SSD 100).

The SSD 100 includes a volatile memory 130 and a non-volatile memory 140. The volatile memory device 130 and the non-volatile memory 140 are in communication with the controller 120.

In some implementations, the non-volatile memory 140 can be an array of non-volatile memory dies as shown. The non-volatile memory 140 includes non-volatile memory dies 142a-142d, 144a-144d, 146a-146d, and 148a-148d, which can be arranged in one or more memory communication channels connected to the controller 120. For example, dies 142a-d may be configured on one memory channel, dies 144a-d on another, and so on. While the 16 non-volatile memory dies 142a-142d, 144a-144d, 146a-146d, and 148a-148d are shown in FIG. 1A, the non-volatile memory 140 of the SSD 100 can include any suitable number of non-volatile memory dies that are arranged in one or more channels in communication with the controller 120.

In one implementation, the non-volatile memory dies 142a-142d, 144a-144d, 146a-146d, and 148a-148d includes NAND flash memory. The NAND flash memory includes flash memory. For example, each NAND flash memory device includes one or more individual NAND flash dies, which are non-volatile memory devices capable of retaining data without power. Each of the non-volatile memory dies 142a-142d, 144a-144d, 146a-146d, and 148a-148d has one or more planes. Each plane has multiple blocks, and each block has multiple pages. Data may be written to the pages in a block in consecutive order, once all the pages are written no more data is written until the block is erased, whereupon the pages can be written with new data in consecutive order again, and so on.

In some implementations, the volatile memory device 130 includes a volatile memory DRAM buffer. The volatile memory device 130 can be a single device of a unitary type or multiple devices of different types capable of providing a volatile memory buffer for the SSD 100.

The controller 120 can combine raw data storage in the non-volatile memory dies 142a-142d, 144a-144d, 146a-146d, and 148a-148d such that those non-volatile memory dies 142a-142d, 144a-144d, 146a-146d, and 148a-148d function like a single storage. The controller 120 can include microcontrollers, buffers, error correction functionality, flash translation layer (FTL), flash interface layer (FTL), flash controllers, flash management layer software, address mapping table, and firmware for implementing such functions as further described herein. In some arrangements, the software/firmware can be stored in the non-volatile memory 140 or in any other suitable computer readable storage medium.

The controller 120 includes suitable processing and memory capabilities for executing functions described herein, among other functions. For example, the controller 120 includes one or more processors (e.g., central processing units (CPUs)) for implementing the various functions of the SSD 100. As described, the controller 120 manages various features for the non-volatile memory dies 142a-142d, 144a-144d, 146a-146d, and 148a-148d including but are not limited to, I/O handling, reading, writing, erasing, monitoring, logging, error handling, garbage collection, wear leveling, logical to physical (L2P) address mapping, and the like.

Figure 1B:
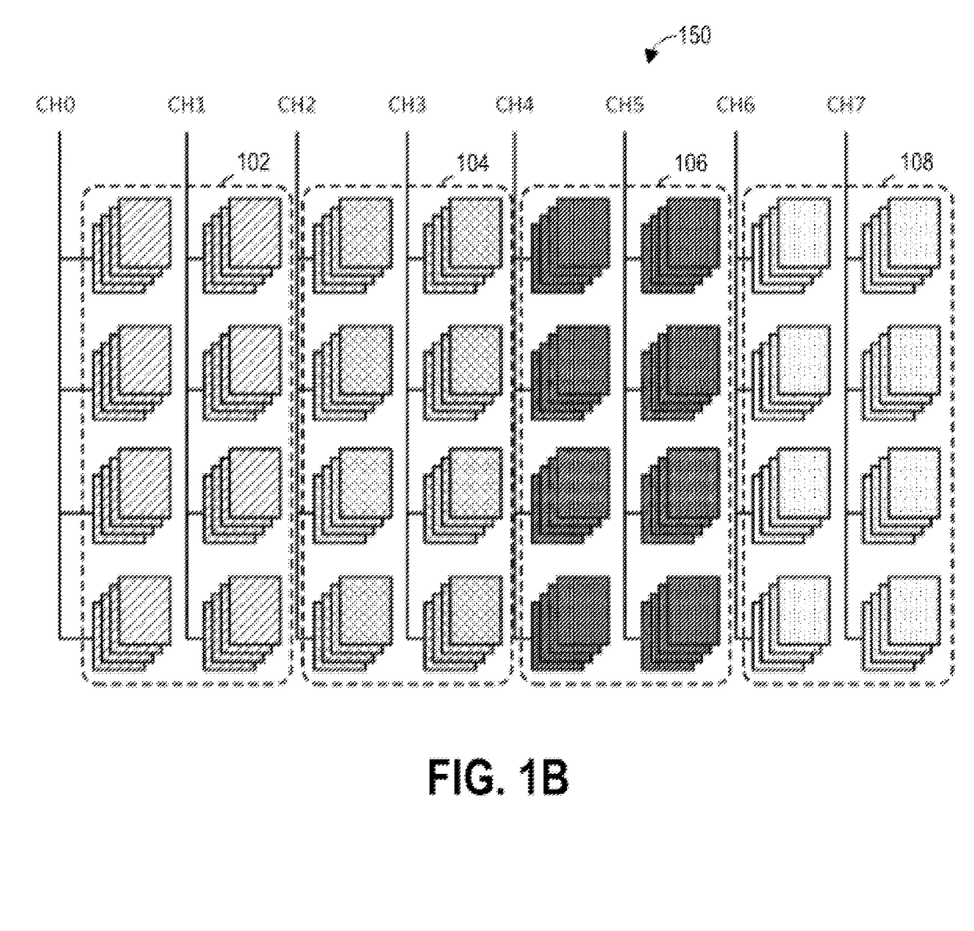
FIG. 1B is a block diagram of an SSD architecture supporting low latency operation, according to some implementations.

FIG. 1B is a block diagram of an SSD architecture 150 supporting low latency operation, according to some implementations. Referring to FIGS. 1A and 1B, the SSD architecture 150 can be configured from a non-volatile memory of a SSD such as but not limited to, the non-volatile memory 140. As shown in FIG. 1B, the SSD architecture 150 includes an array of 32 non-volatile memory dies are arranged across 8 channels (CH0-CH7), with 4 non-volatile memory dies coupled to each channel. In other words, the SSD architecture 150 includes an array of NAND flash memory devices. Each of the non-volatile memory dies has one or more planes. One of ordinary skill in the art can appreciate that any suitable number of dies can be operatively coupled to any suitable number of channels. Each of the non-volatile memory dies in the SSD architecture 150 can be one of the non-volatile memory dies 142a-142d, 144a-144d, 146a-146d, and 148a-148d. The channels CH0-CH7 can be a physical channel or a logical channel.

Rather than superblocks formed by selecting a physical block from each of the non-volatile memory dies across all 8 channels, the SSD architecture 150 includes superblocks formed by selecting all of the physical blocks from each of the non-volatile memory dies on the same channel and an adjacent channel (denoted by the same shading). Each of these superblocks forms an isolation region (e.g., a region that is isolated form other regions) within the SSD that is unaffected by channel I/O activity to other regions of the SSD, since each region is accessed via channels which are not shared with other regions. Each isolation region can be referred to as a NVM set. Thus, in the SSD architecture 150, an isolation region 102 includes the physical blocks of the non-volatile memory dies on the two channels CH0 and CH1. An isolation region 104 includes the physical blocks of the non-volatile memory dies on the two channels CH2 and CH3. An isolation region 106 includes the physical blocks of the non-volatile memory dies on the two channels CH4 and CH5. An isolation region 108 includes the physical blocks of the non-volatile memory dies on the two channels CH6 and CH7.

By configuring the superblocks using only the physical blocks from the non-volatile memory dies in a fixed number of separate channel(s) to form isolation regions, such as shown in FIG. 1B, I/O operation collisions at the non-volatile memory dies and the channel controllers can be minimized or avoided altogether, allowing for lower latency, greater predictability, and more consistent I/O performance of the SSD. As shown, each of the isolation regions 102-108 includes the non-volatile memory dies coupled to multiple (e.g., two) channels, thus leveraging multiple channel controllers per isolation region to handle host I/O operations to improve throughput per isolation region. Alternatively, an isolation region can include non-volatile memory dies coupled to one channel. Accordingly, the dies of the SSD architecture 150 can be selected and arranged to form the isolation regions 102-108, but in principle any number of channels may be used to form an isolation region, where separate isolation regions do not share channels.

While FIG. 1B illustrates that all dies operatively coupled to a same channel are in a same isolation region, other methods for forming isolation regions allow dies coupled to a same channel to be in separate isolation regions. For example, two dies from each of the channels CH0-CH3 can form a first isolation region while two other dies from each of the channels CH0-CH3 can form a second isolation region. A large number of channels per isolation region improves throughput of the isolation region, however when sharing channels between regions a compromise is made regarding isolation capability, since two regions which have unique dies yet share channels will not have as great a degree of isolation as regions which have completely separate channels.

Figure 2:
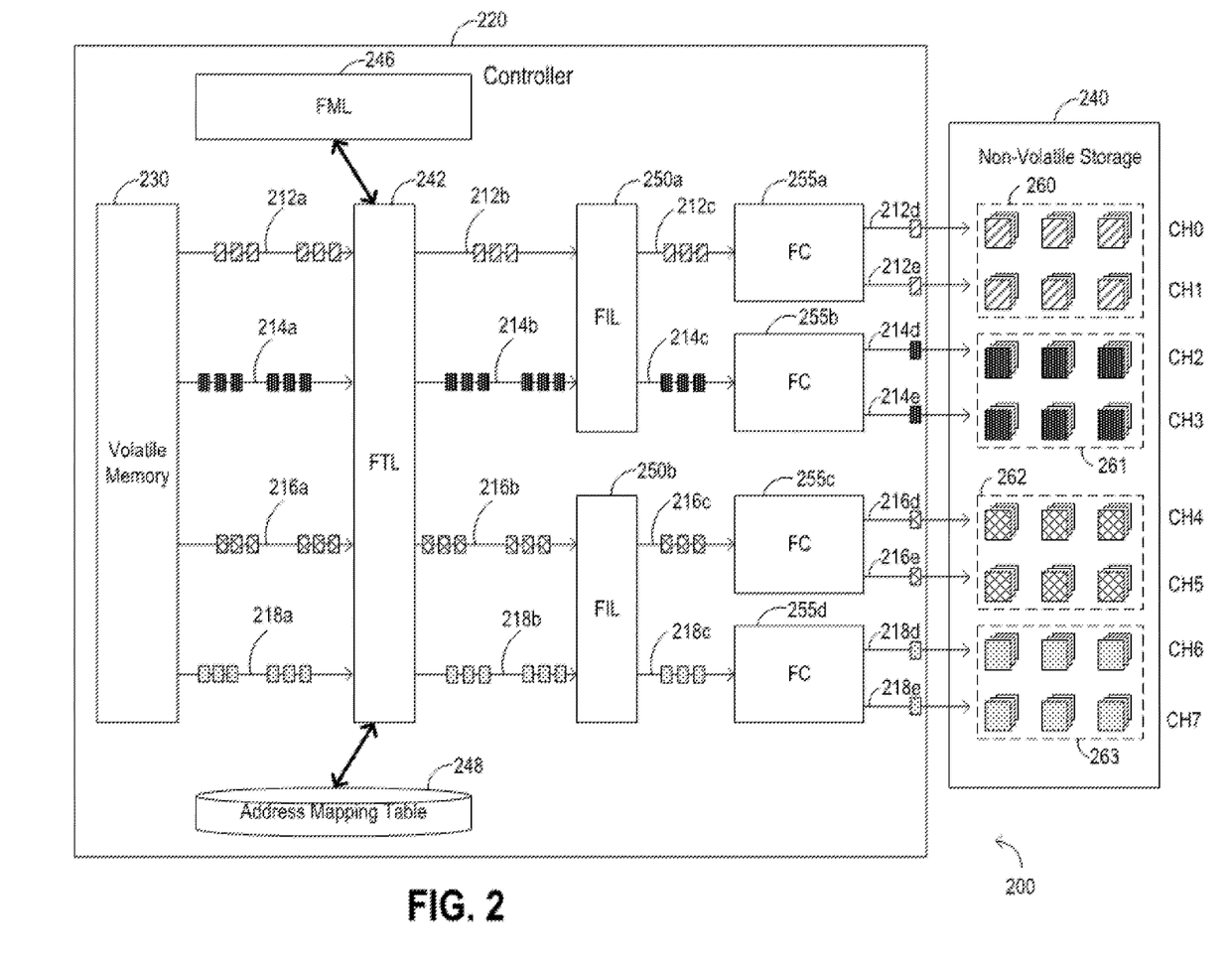
FIG. 2 is a block diagram of an SSD architecture including multiple independent data lanes, according to some implementations.

FIG. 2 is a block diagram of an SSD architecture 200 including multiple independent data lanes, according to some implementations. Referring to FIGS. 1A-2, the SSD architecture 200 includes a controller 220 and a non-volatile storage 240. The controller 220 can be an example implementation of the controller 120. The controller 220 includes a volatile memory 230, which can be a volatile memory such as but not limited to, the volatile memory 130. The non-volatile storage 240 can be a non-volatile memory such as but not limited to, the non-volatile memory 140 or a non-volatile memory having the architecture 150.

The non-volatile storage 240 includes an array of non-volatile memory dies that are arranged across 8 channels (e.g., CH0-CH7), with three non-volatile memory dies coupled to each channel. In other words, the non-volatile storage 240 includes an array of NAND flash memory devices. The channel connections to the individual dies are not shown for the sake of clarity. Each of the non-volatile memory dies has multiple planes. One of ordinary skill in the art can appreciate that any suitable number of dies can be operatively coupled to any suitable number of channels. The channels CH0-CH7 can be a physical channel or a logical channel.

The non-volatile memory dies of the non-volatile storage 240 form isolation regions (physically isolated regions) or NVM sets 260-263. The dies that belong to a same NVM set are denoted by the same shading. For example, the dies operatively coupled to the channels CH0 and CH1 form a NVM set 260. The dies operatively coupled to the channels CH2 and CH3 form a NVM set 261. The dies operatively coupled to the channels CH4 and CH5 form a NVM set 262. The dies operatively coupled to the channels CH6 and CH7 form a NVM set 263.

The controller 220 includes various processors configured to perform various processes of the controller 220. For example, a FTL processor 242 (e.g., a FTL interface module) can process an address mapping table 248 (e.g., a L2P mapping table). The address mapping table 248 is a mapping table that keeps records of the correspondence between logical addresses and physical addresses. For example, the address mapping table 248 can translate read and write commands (received from the host) with respect to logical blocks into low-level commands that reference physical blocks. In some examples, a read or write command received from the host includes at least a logical block address (LBA). The LBA is a logical address that identifies a logical block, which may be a region in a sector. In some examples, the write command can also include a number of regions/sectors to which the data is to be written. The address mapping table 248 stores mapping between each logical address and one or more physical addresses (e.g., pages of a memory die) where data of the logical address is stored.

The FTL processor 242 can perform L2P operations based on the address mapping table 248. For example, the FTL processor 242 can translate a LBA into a physical address, thus resolving the physical address corresponding to the LBA. Responsive to receiving a write or read command (containing a LBA therein) from the host, the FTL processor 242 can look up the physical address corresponding to the LBA by using the address mapping table 248 in order to write to or read from the physical address. The address mapping table 248 can be stored in one or more of the non-volatile storage 240, the volatile memory 230, or a suitable memory of the controller 220.

The controller 220 includes a flash management layer (FML) processor 246 in some implementations. The FML processor 242 manages the flash memory dies, arranges the blocks of memory within dies into optimal groups called Logical Blocks, determines the next Logical Block to be allocated for user data, the next to be selected for garbage collection and for metadata such as mapping look up tables. The FML also monitors the progress of write commands and prepares the next block for writing in advance and manage the triggers for checking of retention reliability of data previously stored.

The controller 220 includes flash interface layers (FIL) processors 250a and 250b in some implementations. The FIL processors 250a and 250b provide the interface between the FTL and the Flash Controllers (FC 255a/b and 255c/d respectively). The FIL processes incoming flash commands from the FTL in a command queue (not shown for clarity), scheduling them in an optimal fashion to the appropriate Flash Controller for the destination physical memory bank (die) for the command. Responses from the commands are handled from the FC and stored in response queue (not shown for clarity), indicating to the FTL the success or failure of the command. As shown, each of the FIL processors 250a and 250b is in the I/O path for two of the NVM sets 260-263. For example, the FIL processor 250a is in the I/O path for the NVM sets 260-261. The FIL processor 250b is in the I/O path for the NVM sets 262-263.

The controller 220 further includes flash controllers (FCs) 255a-255d in some implementations. The FCs 255a-255d take the memory commands from the FIL and schedule the commands on the individual memory channels, performing the necessary memory bus control signaling and data transfers to the memory dies and checking the memory die status for the success or failure of the commands. As shown, each of the NVM sets 260-263 has one different one of the FCs 255a-255d. For instance, the FC 255a is in the I/O path of the NVM set 260. The FC 255b is in the I/O path of the NVM set 261. The FC 255c is in the I/O path of the NVM set 262. The FC 255d is in the I/O path of the NVM set 263.

Each of the processors 242, 246, 250a-250b, and 255a-255d can be a separate processor (e.g., CPU), processing circuit, or microcontroller in some implementations. In other words, each of the processors 242, 246, 250a-250b, and 255a-255d refers to a separate hardware component that may remain unchanged post-manufacture. In alternative implementations two or more of the processors 242, 246, 250a-250b, and 255a-255d can be implemented on a same processor, processing circuit, or microcontroller. The controller 220 (including the processors 242, 246, 250a-250b, and 255a-255d, the volatile memory 230, and the address mapping table 248 (if stored in a memory of the controller)) can be implemented using hardware such as but not limited to, a system-on-chip (SoC). As described in further detail herein, the firmware on which the processors 242, 246, 250a-250b, and 255a-255d, the volatile memory 230, and the address mapping table 248 runs can be used to configure a given number of data lanes. The firmware handles and manages the non-volatile storage 240, the I/O operations, and the background operations of the SSD architecture 200.

An IPC is used for communications between two components (e.g., two processes running on processors,) of the SSD architecture 200. An IPC corresponds to signaling over a communication link from a sender processor or process to a receiver processor or process. For instance, the IPC can provide communication protocols that allow communication of instructions, messages, and tasks between the sender processor or process and the receiver processor or process. Each of the instructions, messages, and tasks carries an indication of a task to be performed by the receiver processor or process and context identifiers or references to data used in the task. In some implementations, each IPC corresponds to configured software/firmware such as but not limited to, a software queue, a message queue, shared memory or a mailbox configured using a suitable protocol between the sender process and the receiver process. In some implementations, each IPC corresponds to a communication port established by the controller 220 for communications between the sender process and the receiver process, such as but not limited to, an internet protocol (IP) port or socket. Alternatively, each IPC is a physical communication link such as but not limited to, a bus (e.g., a peripheral component interconnect (PCI)), a serial communications link, a physical IPC port, a channel, and so on.

The firmware of the controller 220 can configure any suitable number of NVM sets from the dies in the non-volatile storage 240 and can configure a same number of independent data lanes. In other words, the firmware of the controller 220 can configure an independent data lane for each configured NVM set such that all instructions, messages, and tasks for that NVM set can be carried using the corresponding independent data lane, and the corresponding independent data lane does not carry any instruction, message, or task for another NVM set.

As shown, a first independent data lane is provided along the I/O path for the NVM set 260. The first independent data lane includes multiple IPCs/links 212a, 212b, 212c, 212d, and 212e. The IPC 212a is used to carry instructions, messages, and tasks from the volatile memory 230 to the FTL processor 242. The IPC 212b is used to carry instructions, messages, and tasks between the FTL processor 242 and the FIL processor 250a. The IPC 212c is used to carry instructions, messages, and tasks between the FIL processor 250a and the FC 255a. The link 212d is a flash memory channel used to carry commands/operations, data and messages, between the FC 255a and the dies of the NVM set 260 that are operatively coupled to the channel CH0. The link 212e is a flash memory channel used to carry commands/operations, data and messages between the FC 255a and the dies of the NVM set 260 that are operatively coupled to the channel CH1. The first independent data lane includes two links 212d and 212e from the FC 255a to the NVM set 260 in the non-volatile storage 240 given that the links between the FC 255a to the NVM set 260 are channel-specific. The first independent data lane carries the commands/operations, data and messages for only the NVM set 260 and not another NVM set.

A second independent data lane is provided along the I/O path for the NVM set 261. The first independent data lane includes multiple IPCs/links 214a, 214b, 214c, 214d, and 214e. The IPC 214a is used to carry instructions, messages, and tasks from the volatile memory 230 to the FTL processor 242. The IPC 214b is used to carry instructions, messages, and tasks between the FTL processor 242 and the FIL processor 250a. The IPC 214c is used to carry instructions, messages, and tasks between the FIL processor 250a and the FC 255b. The link 214d is a flash memory channel used to carry commands/operations, data, and messages between the FC 255b and the dies of the NVM set 261 that are operatively coupled to the channel CH2. The link 214e is a flash memory channel used to carry commands/operations, data, and messages between the FC 255b and the dies of the NVM set 260 that are operatively coupled to the channel CH3. The first independent data lane includes two links 214d and 214e from the FC 255b to the NVM set 261 in the non-volatile storage 240 given that the links between the FC 255b to the NVM set 261 are channel-specific. The second independent data lane carries the commands/operations, data, and messages for only the NVM set 261 and not another NVM set.

A third independent data lane is provided along the I/O path for the NVM set 262. The third independent data lane includes multiple IPCs/links 216a, 216b, 216c, 216d, and 216e. The IPC 216a is used to carry instructions, messages, and tasks from the volatile memory 230 to the FTL processor 242. The IPC 216b is used to carry instructions, messages, and tasks between the FTL processor 242 and the FIL processor 250b. The IPC 216c is used to carry instructions, messages, and tasks between the FIL processor 250b and the FC 255c. The link 216d is a flash memory channel used to carry commands/operations, data, and messages between the FC 255c and the dies of the NVM set 262 that are operatively coupled to the channel CH4. The link 216e is a flash memory channel used to carry commands/operations, data, and messages between the FC 255c and the dies of the NVM set 262 that are operatively coupled to the channel CH5. The third independent data lane includes links IPCs 216d and 216e from the FC 255c to the NVM set 262 in the non-volatile storage 240 given that the links between the FC 255c to the NVM set 262 are channel-specific. The third independent data lane carries the commands/operations, and messages for only the NVM set 262 and not another NVM set.

A fourth independent data lane is provided along the I/O path for the NVM set 263. The fourth independent data lane includes multiple IPCs/links 218a, 218b, 218c, 218d, and 218e. The IPC 218a is used to carry instructions, messages, and tasks from the volatile memory 230 to the FTL processor 242. The IPC 218b is used to carry instructions, messages, and tasks between the FTL processor 242 and the FIL processor 250b. The IPC 218c is used to carry instructions, messages, and tasks between the FIL processor 250b and the FC 255d. The link 218d is a flash memory channel used to carry commands/operations, data, and messages between the FC 255d and the dies of the NVM set 263 that are operatively coupled to the channel CH6. The link 218e is a flash memory channel used to carry commands/operations, data, and messages between the FC 255d and the dies of the NVM set 263 that are operatively coupled to the channel CH7. The fourth independent data lane includes two links 218d and 218e from the FC 255d to the NVM set 263 in the non-volatile storage 240 given that the links between the FC 255d to the NVM set 263 are channel-specific. The fourth independent data lane carries the commands/operations, and messages for only the NVM set 263 and not another NVM set.

The boxes shown along or in the IPCs 212a-212c, 214a-214c, 216a-216c, and 218a-218c refer to instructions, messages, and tasks carried in corresponding ones of the IPCs 212a-212c, 214a-214c, 216a-216c, and 218a-218c. The boxes having the same shading as that of a corresponding one of the NVM sets 260-263 refer to instructions, messages, and tasks related to the corresponding NVM set and not another NVM set.

While the processors 242, 246, 250a-250b, and 255a-255d and the storage devices 230 and 240 are shown as examples of entities such that an IPC and flash channels between two of those entities can be established for each NVM set, the IPC and-flash channels-per-NVM set scheme can be likewise be implemented for additional processors (e.g., the host interface 110) and storage devices.

As shown in FIG. 2, multiple IPCs each for a different one of the NVM sets 260-263 can be established via firmware between a sender process and a receiver process, instead of one IPC for all of the NVM sets 260-263. Given that each processor performs one or more dedicated functions (or "work" or "tasks"), multiple IPCs each for a different one of the NVM sets 260-263 are established for the same functions. As such, the SSD architecture 200 and particularly, the arrangement of the controller 220 reduce or prevent the bottleneck at the controller 220 that result from cramping messages, instructions, and tasks for multiple NVM sets in a same IPC. Accordingly, in the disclosed implementations, when delay occurs with respect to one of the NVM sets 260-263, only the data lane corresponding to the delayed NVM set is affected.

Figure 3:
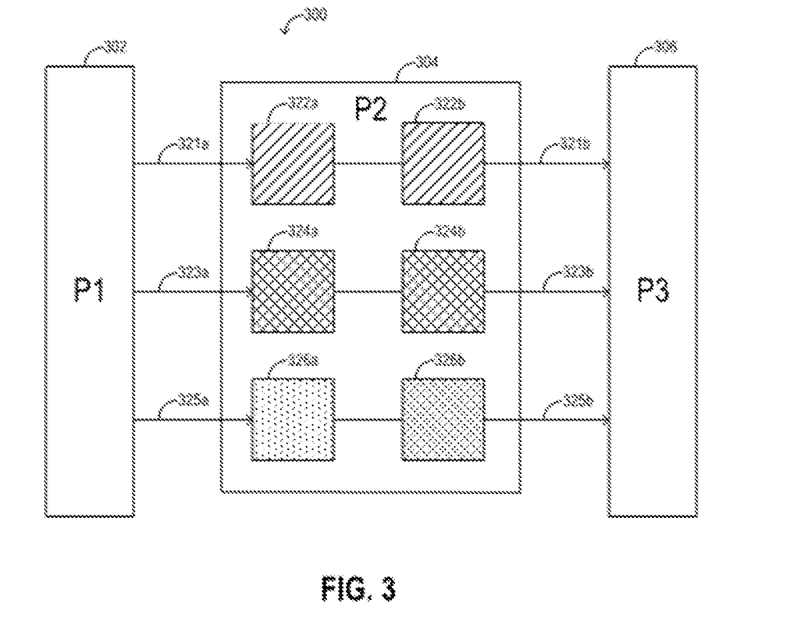
FIG. 3 is a block diagram illustrating an inter-process flow, according to some implementations.

FIG. 3 is a block diagram illustrating an inter-process flow 300, according to some implementations. Referring to FIGS. 1A-3, the inter-process flow 300 can be implemented using the systems and architectures 100, 150, and 200. P1 302, P2 304, and P3 306 each refers to any processor of a controller such as but not limited to, the controllers 120 and 220. In some examples, each of P1 302, P2 304, and P3 306 can be one of the processors 242, 246, 250a-250b, and 255a-255d.

In the inter-process flow 300, three independent data lanes are established. Each independent data lane corresponds to a different one of three NVM sets (not shown) established in a non-volatile storage such as but not limited to, the non-volatile memory 140, the architecture 150, and the non-volatile storage 240. For example, a first independent data lane for a first NVM set includes an IPC 321a, an IPC 321b, and one or more additional IPCs not shown. A second independent data lane for a second NVM set includes an IPC 323a, an IPC 323b, and one or more additional IPCs not shown. A third independent data lane for a third NVM set includes an IPC 325a, an IPC 325b, and one or more additional IPCs not shown. The IPCs 321a, 323a, and 325a convey instructions, messages, and tasks between P1 302 and P2 304. The IPCs 321b, 323b, and 325b convey instructions, messages, and tasks between P2 304 and P3 306.

P1 302 is a sender processor or process that can be configured by the firmware of the controller to push instructions, messages, and tasks 322a and 322b for the first NVM set to P2 304 via the IPC 321a, which is dedicated to the first NVM set. P1 302 can be configured by the firmware of the controller to push instructions, messages, and tasks 324a and 324b for the second NVM set to P2 304 via the IPC 323a, which is dedicated to the second NVM set. P1 302 can be configured by the firmware of the controller to push instructions, messages, and tasks 326a and 326b for the third NVM set to P2 304 via the IPC 325a, which is dedicated to the third NVM set. P2 304 is a processor that can process the instructions, messages, and tasks 322a, 322b, 324a, 324b, 326a, and 326b. In some examples, the instructions, messages, and tasks 322a, 322b, 324a, 324b, 326a, and 326b are of a same type given that the same processor P2 304 is used to process those instructions, messages, and tasks 322a, 322b, 324a, 324b, 326a, and 326b.

P2 304 is a sender processor or process that can be configured by the firmware of the controller to push instructions, messages, and tasks 322a and 322b for the first NVM set to P3 306 via the IPC 321b. P2 304 can be configured by the firmware of the controller to push instructions, messages, and tasks 324a and 324b for the second NVM set to P3 306 via the IPC 323b. P2 304 can be configured by the firmware of the controller to push instructions, messages, and tasks 326a and 326b for the third NVM set to P3 306 via the IPC 325b.

P2 304 can process the instructions, messages, and tasks 322a, 322b, 324a, 324b, 326a, and 326b sequentially based on the independent data lanes, e.g., one of the tasks in the IPC 321a (e.g., in the software queue) for the first NVM set is processed, then one of the tasks in the IPC 323a (e.g., in the software queue) for the second NVM set is processed, then one of the tasks in the IPC 325a (e.g., in the software queue) for the third NVM set is processed, and when one task from each of the IPCs 321a, 323a, and 325a has been processed, P2 304 beings to process a next task in the IPC 321a for the first NVM set, and so on. Alternatively, instructions, messages, and tasks for two or more or all of the independent data lanes can be processed by P2 304 simultaneously. The instructions, messages, and tasks 322a, 322b, 324a, 324b, 326a, and 326b can have a uniform size, as discussed in further detail in (U.S. patent application Ser. No. 16/523,922), titled "OPTIMAL TRANSFER AND PROCESSING UNIT ON IPC FOR IOD SSD," which is hereby incorporated by reference in its entirety. Further details regarding the manner in which the instructions, messages, and tasks are processed are discussed in (U.S. patent application Ser. No. 16/523,948), titled "TWO-LAYERED DETERMINISTIC INTER-PROCESS COMMUNICATION SCHEDULER FOR INPUT OUTPUT DETERMINISM IN SOLID STATE DRIVES," which is hereby incorporated by reference in its entirety.

In some examples, the instructions, messages, and tasks 322a, 322b, 324a, 324b, 326a, and 326b can be parts of I/O operations (e.g., read and write), background operations (e.g., garbage collection, compaction, wear levelling, power loss protection and data refresh), start/stop I/O, and so on.

The inter-process flow 300 illustrates establishing an independent IPC for all the instructions, messages, and tasks of each NVM set that are communicated between two processes, and that two or more of such IPCs for each NVM set can form an independent data lane for each NVM set. Such independent data lanes for I/O operations (as well as background operations) minimize or eliminate effects other NVM sets due to congestions on one NVM set. For example, if the NAND is busy on the first NVM set or controller resources for the first NVM set are unavailable, P2 304 can handle the instructions, messages, and tasks 324a, 324b, 326a, and 326b for other NVM sets before processing one or both of the instructions, messages, and tasks 322a, and 322b. As such, the latency on the second and third NVM sets remains unaffected by congestion on the first NVM set.

Figure 4:
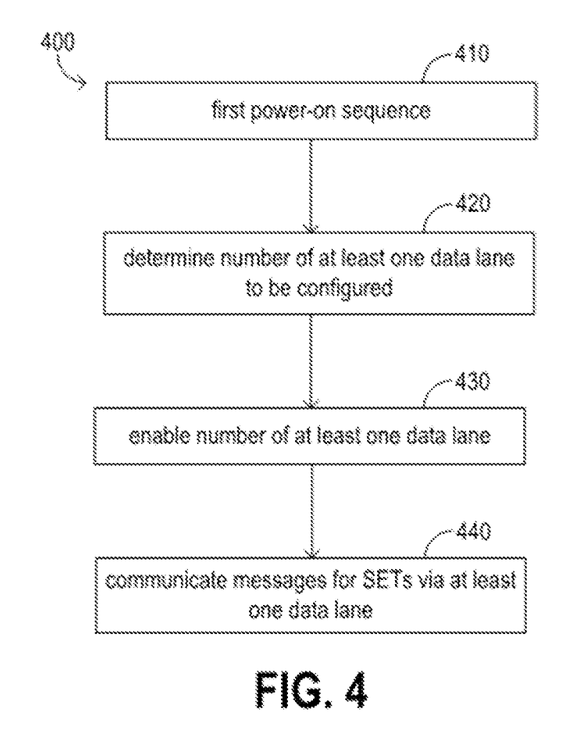
FIG. 4 is a flow diagram illustrating an example process for enabling one or more data lanes, according to some implementations.

FIG. 4 is a flow diagram illustrating an example process 400 for enabling one or more data lanes, according to some implementations. Referring to FIGS. 1A-4, the process 400 can be implemented by the firmware of the controller 120 or 220 on the systems and architecture 100, 150, or 200. The hardware (e.g., the processors/storages 230, 242, 246, 248, 250a, 250b, 255a-255d, and 302-306 provided on a SoC) regardless of number or function, remain unchanged once manufactured. The firmware controlling the hardware can configure the hardware to establish any number of data lanes depending on whether a customer of the SSD desires, for the same hardware, a non-IOD SSD configuration or an IOD SSD solution. In one example, the firmware can establish one data lane in the controller for the non-volatile storage (e.g., the non-volatile memory 140) in a non-IOD configuration (regions of the non-volatile memory are not isolated to form isolation regions or NVM sets). In another example, the firmware can establish one data lane in the controller for all NVM sets of the non-volatile storage (e.g., the non-volatile storage 240 or a non-volatile storage using the architecture 150) in an IOD configuration. In yet another example, the firmware can establish one data lane in the controller for each of the NVM sets of the non-volatile storage in an IOD configuration, for example, as described with reference to FIGS. 2 and 3. As such, given that SSD products may require both IOD and non-IOD solutions, the same hardware is configurable through the firmware post-manufacture to enable one independent data lane per NVM set or another other data lane configurations, based on customer preference.

At 410, an SSD (e.g., a controller thereof) executes a first power-on sequence. The first power-on sequence is the very first power-on sequence for the SSD post-manufacturing, and that no other power-on sequences have been executed before the first power-on sequence. The data lane configuration is performed during the first power-on sequence in some implementations. In other implementations, the data lane configuration (e.g., blocks 420 and 430) is performed at another time.

At 420, the controller determines a number of at least one data lane to be configured. For example, the number can be one data lane for communicating data for a non-volatile storage that is not isolated (conventional non-IOD SSD) or the non-volatile storage that is isolated into multiple NVM sets (IOD SSD), or one independent data lane for each NVM set (IOD SSD). The number of data lanes can be one up to a maximum configuration number of data lanes. The number is a single parameter. The number of data lanes also equals to a number of NVM sets to isolate to configure the IOD features for the SSD.

The number can be determined based on host or customer preference. In some examples, the number of data lanes can be received from the host during the first power-on sequence if the host is operatively coupled to the controller. In some examples, the number of data lanes is determined by checking a device configuration file for the SSD. The device configuration file or profile is checked during the first power-on sequence to set up the SSD, including the data lane(s). The host or customer preference of the number of data lanes can be contained in the device configuration file. The device configuration file can be stored in any suitable memory device of the controller or can be received from another device.

At 430, the controller enables the number of at least one data lane. Each data lane includes an IPC for each pair of sender/receiver processor or process along the data lane. This means that the IPCS can be scaled up based on the number of desired NVM setS. In the example in which the number of data lanes is one, one data lane is enabled to be operatively coupled to the non-volatile storage in the non-IOD case or operatively coupled to the NVM sets of the non-volatile storage in the IOD case. In the example in which the number of data lanes is more than one and equals to the number of NVM sets (e.g., one independent data lane per NVM set), one data lane is enabled to be operatively coupled to each of a plurality of NVM sets of the non-volatile storage in the IOD case.

Each IPC can be defined via software to be a software queue, a message queue, or a mailbox. In some implementations, each IPC can be a purely software IPC due to lack of physical ports as the firmware creates the NVM sets using first-in-first-outs (FIFOs) inside the processes. For instance, upon the IPC messages being received over a common queue, the IPC messages are reorganized and queued up in the FIFOs based on the NVM set identifier in the IPC message. Moreover, each IPC can be defined via hardware such that each IPC can be a physical bus, physical IPC port, a physical channel, and so on. The controller may have a given number of physical buses, IPC ports, and/or physical channels available. The number of the physical buses, IPC ports, and/or physical channels as determined at 420 out of all available physical buses, IPC ports, and/or physical channels can be used. As such, each IPC can be defined by connecting two physical ports on two processors. Furthermore, a shared memory flag, shared memory bitmap, or a shared memory structure that is identical for each NVM set can be implemented such that sender process sets a value that is polled by another process to trigger a task independent of the shared memory content for other NVM sets.

In some implementations, latency-critical IPC messages can be identified such that a separate IPC can be established for each NVM set to carry the latency-critical IPC messages. In some implementations, processors/storages that perform I/O related operations such as but not limited to read and write (e.g., determining a logical address to read from or to write to, determining a physical address to read from or to write to based on the logical address, and so on) are latency-critical while background operations (e.g., garbage collection, compaction, wear levelling, power loss protection and data refresh) are non-latency-critical. In some implementations, non-latency-critical IPC messages can be routed via a same IPC for all NVM sets.

In one example in which the IPC messages between the volatile memory 230 and the FTL 242 are predetermined to be latency-critical, IPCs 212a, 214a, 216a, and 218a are established to carry messages for the NVM sets 260-263 respectively. In another example in which the IPC messages between the FTL 242 and the FILs 250a and 250b are predetermined to be latency-critical, IPCs 212b, 214b, 216b, and 218b are established to carry messages for the NVM sets 260-263 respectively.

In some examples, a NVM set identifier can be included in each instruction, message, or task (e.g., each of the instructions, messages, or tasks 322a, 322b, 324a, 324b, 326a, and 326b) sent via an independent data lane or an independent IPC. The set identifier can be a part of the metadata of the instruction, message, or task. The sender processor or process and the receiver processor or process can use the NVM set identifier to identify the NVM set corresponding to the instruction, message, and task. For example, sender processor or process can determine through which IPC the instruction, message, and task should be sent or pushed by reading the NVM set identifier. The receiver processor or process can identify the NVM set corresponding to the instruction, message, and task for purpose of processing the instruction, message, and task. The receiver processor or process can apply different algorithms and allocate different bandwidths instructions, messages, and tasks for different NVM sets. Accordingly, the NVM set identifier is used for a handshake between the sender processor or process and the receiver processor or process.

At 440, the controller communicates instructions, messages, and tasks via the data lane(s) configured at 430. In the example in which one total data lane is enabled, the instructions, messages, and tasks for the non-volatile storage (in the non-IOD case) or for the NVM sets of the non-volatile storage (in the IOD case) are communicated via that one data lane. In the example in which one independent data lane is enabled for each NVM set, all instructions, messages, and tasks for each of the plurality of NVM sets are communicated via a corresponding one of the plurality of independent data lanes established.

Figure 5:
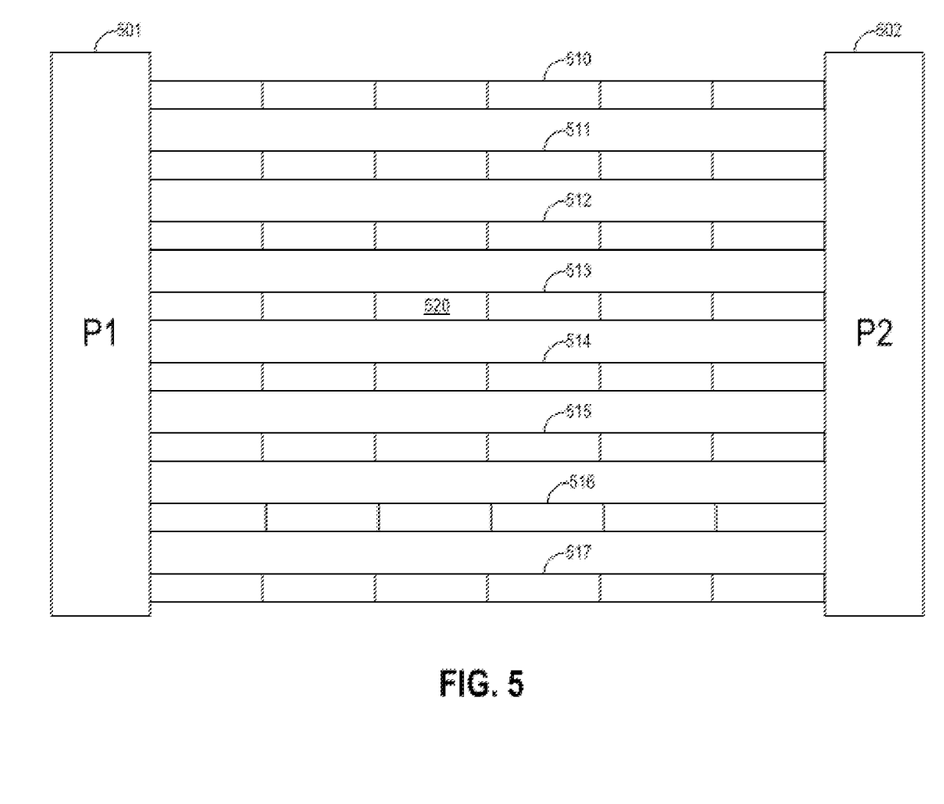
FIG. 5 is a block diagram illustrating lengths of IPCs operatively coupled to two processors, according to some implementations.

In some examples involving an IOD SSD with multiple NVM sets isolated, enabling the number of at least one data lane (which includes one or more IPCs) at 430 further includes determining and adjusting a depth of each independent IPC based on a maximum processing capability or bandwidth of the receiver processor and a number of total NVM sets. FIG. 5 is a block diagram illustrating lengths of IPCs 510-517 operatively coupled to processors P1 501 and P2 502, according to some implementations.

Referring to FIGS. 1A-5, P1 501 and P2 502 each refers to any processor or process of a controller such as but not limited to, the controllers 120 and 220. In some examples, each of P1 501 and P2 502 can be one of the processors 242, 246, 250a-250b, and 255a-255d, the volatile memory 230, and the address mapping table 248. Each of the IPCs 510-517 can be established for a respective one of eight NVM sets in the manner described herein. Each of the IPCs 510-517 can be a portion of an independent data lane for a respective one of the eight NVM sets.

A conventional IPC can be a software queue such as but not limited to, a layout release request queue. As described herein, all instructions, message, and tasks for the non-volatile memory are communicated via a same conventional IPC. The depth of a conventional IPC is based on processing capabilities, memory requirements, and bandwidth of the receiver processor or process (P2 502). The deeper the conventional IPC is (e.g., the more instructions, message, and tasks can be queued), the more processing capabilities, memory, and bandwidth the receiver processor or process has. For example, the depth of a convention layout release request queue (e.g., only one layout release request queue linking the sender and receiver processors/storages) equals to a look-up table (LUT) update completion queue. An example depth of the convention layout release request queue is 48, meaning that P2 502 can process and complete 48 tasks in 1 ms.

As multiple IPCs are enabled to carry instructions, messages, and tasks from the sender processor or process P1 501 to the receiver processor or process P2 502 (e.g., the IPCs are scaled up), it can be preferred to maintain the processing capabilities, memory requirements, and bandwidth of P2 502 given that increasing the processing capabilities, memory requirements, and bandwidth of P2 502 can be significantly costly. As such, when enabling the number of data lanes at 430, the depth of each of the IPCs 510-517 between P1 501 and P2 502 can be determined by dividing the depth of the conventional IPC between P1 501 and P2 502 (e.g., 48) by a total number of NVM sets (e.g., 8). As shown, each of the IPCs 510-517 has a depth of 6, meaning that 6 instructions, messages, or tasks can be queue in each of the IPCs 510-517*n* for P2 502 to process. As such, P2 502 can still perform 48 tasks in 1 ms using the IPCs 510-517.

Each box in the 8 IPCs 510-517*n* refers to a location or position of an instruction, message, or task in queue. The location/position can be determined using an index such as an IPC layout release index IPC_LYT_REL. The IPC layout release index for instruction m (where 0<m<IPC_DEPTH−1) in NVM setn (where 0<n<8) (e.g., m=2, n=3 corresponding to instruction 520 IPC 513) can be determined using the following expression:

$$IPC\_LYT\_REL[INSm,SETn]=m+IPC[SET0]+(n\times IPC_{DEPTH});$$

where IPC[SET0] refers to the index for the first instruction in IPC 510 for SET0, and IPC_DEPTH refers to the depth of the items (e.g., instructions, messages or tasks) in each of the IPCs 510-517*n*, which is 6.

Accordingly, implementations described herein relate to firmware-managed independent NVM set data lanes within controller to achieve low-latency inter-process communication scheme to avoid the "noisy neighbor" effect in IOD drive, to address the issue of the controller contributing to collisions between the I/O of multiple NVM sets, which in turn contributes to I/O latencies even though the NAND is partitioned into isolated NVM sets.

The same firmware can provide for various different configurations of IOD SSDs and management of the I/O path for each IOD NVM set within a controller designed for a generic non-IOD SSD. Such implementations allow scaling up of the design of the firmware for each NVM set independently, dividing the controller resources (such as but not limited to, CPU, hardware components, memory, and so on) in a manner to as to avoid contention, which compromises the latency and performance for I/O workloads on any of the NVM sets.

The independent data lanes as described herein can be used for streams and non-stream isolation to avoid performance impact of multiple streams due to background operations on the non-stream. The independent IPC scheme can be extended for many solutions such as but not limited to, IOD solutions on quad-level cells (QLC) NAND and any future NAND products, drives with host-managed schemes that are a mix of IOD and streams, any drive that has multiple isolated partitions on NAND and demand latency improvements amongst the isolated partitions, and so on.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A solid-state drive (SSD), comprising:
a non-volatile memory (NVM); and
a controller comprising a plurality of processors, a first plurality of communication links between the plurality of processors, and a second plurality of communication links between the plurality of processors and the NVM, wherein the controller is configured to:
establish, using the first and second plurality of communication links, a plurality of data lanes configured to communicate messages between the plurality of processors of the controller, and between each of the processors and the NVM, wherein each of the data lanes comprises a respective set of the first plurality of communication links between the plurality of processors and a respective one of the second plurality of links between the plurality of processors and the NVM, and configure each data lane to communicate messages independently from all of the other data lanes.

2. The SSD of claim 1, wherein
the NVM is an array of NVM dies or an array of NAND flash memory devices;
each of the NVM dies has at least one plane;
two or more of the NVM dies are coupled to a same channel of a plurality of channels; and
each of a plurality of regions of the NVM comprises some of the non-volatile memory dies coupled to at least one of the plurality of channels.

3. The SSD of claim 2, wherein the controller is further configured to determine whether to enable each of the data lanes for communicating the messages for a respective one of the plurality of regions or to enable one data lane for communicating the messages for all of the plurality of regions.

4. The SSD of claim 3, wherein in response to enabling the one data lane for communicating the messages for all of the plurality of regions, the controller is further configured to communicate the messages for the plurality of regions via the data lane.

5. The SSD of claim 2, wherein the controller is further configured to cause each of the plurality of data lanes to be operatively coupled to a corresponding one of the plurality of regions.

6. The SSD of claim 5, wherein the controller is further configured to communicate all messages for each of the plurality of regions via a corresponding one of the plurality of data lanes.

7. The SSD of claim 1, wherein the controller comprises firmware for establishing the plurality of data lanes.

8. The SSD of claim 1, wherein the controller includes a first power-on sequence of the SSD for establishing the plurality of data lanes.

9. The SSD of claim 1, wherein establishing the data lanes comprises:
determining a number of data lanes to be established; and
establishing the data lanes based on the number.

10. The SSD of claim 9, wherein determining the number of data lanes to be established is based on a number of regions in the NVM.

11. The SSD of claim 10, wherein each region comprises a NVM set.

12. The SSD of claim 1, wherein the first and second plurality of communication links comprise inter-process communications (IPCs).

13. The SSD of claim 12, wherein at least one of the IPCs comprises a software queue.

14. The SSD of claim 12, wherein at least one of the IPCs comprises a physical IPC port.

15. The SSD of claim 1, wherein each of the messages for the NVM comprises a region identifier that identifies one of a plurality of regions of the NVM for which each of the messages is communicated.

16. The SSD of claim 12, wherein establishing the data lanes comprises:
enabling a plurality of inter-process communications (IPCs) between a sender processor of the plurality of processors and a receiver processor of the plurality of processors, each of the plurality of IPCs corresponds to a different one of a plurality of regions of the NVM; and
determining a depth of each of the plurality of IPCs based on a processing capability of the receiver processor and a total number of the plurality of regions.

17. A method for managing a solid-state drive (SSD), comprising:
- identifying a plurality of processors of a controller of the SSD and a plurality of communication links between the plurality of processors and between the plurality of processors and a non-volatile memory (NVM);
- configuring, using the plurality of communication links, a plurality of data lanes to communicate messages between the plurality of processors of the controller, and between each of the processors and the NVM, wherein each of the data lanes comprises a respective set of the first plurality of communication links between the plurality of processors and a respective one of the second plurality of links between the plurality of processors and the NVM, and
- wherein configuring includes causing each data lane to communicate messages independently from all of the other data lanes.

18. The method of claim 17, further comprising determining whether to enable each of the data lanes for communicating the messages for a respective one of a plurality of regions of the NVM or to enable one data lane for communicating the messages for all of the plurality of regions.

19. The method of claim 18, further comprising causing each of the plurality of data lanes to be operatively coupled to a corresponding one of the plurality of regions.

20. The method of claim 19, further comprising communicating all messages for each of the plurality of regions via a corresponding one of the plurality of data lanes.

* * * * *